March 11, 1947. P. S. MENOUGH 2,417,083
ANNEALING TRAY
Filed Dec. 15, 1943 6 Sheets-Sheet 1

INVENTOR.
PAUL S. MENOUGH
BY Richey & Watt
ATTORNEYS

March 11, 1947.  P. S. MENOUGH  2,417,083
ANNEALING TRAY
Filed Dec. 15, 1943  6 Sheets-Sheet 2

INVENTOR.
PAUL S. MENOUGH
BY Richey Watts
ATTORNEYS

March 11, 1947. P. S. MENOUGH 2,417,083
ANNEALING TRAY
Filed Dec. 15, 1943 6 Sheets-Sheet 4

INVENTOR.
PAUL S. MENOUGH
BY Richey Watt
ATTORNEYS

March 11, 1947.  P. S. MENOUGH  2,417,083
ANNEALING TRAY
Filed Dec. 15, 1943  6 Sheets-Sheet 5

INVENTOR.
PAUL S. MENOUGH
BY
ATTORNEYS

March 11, 1947.　　　P. S. MENOUGH　　　2,417,033
ANNEALING TRAY
Filed Dec. 15, 1943　　　6 Sheets-Sheet 6

INVENTOR.
PAUL S. MENOUGH
BY
Rickey & Watts
ATTORNEYS

Patented Mar. 11, 1947

2,417,083

UNITED STATES PATENT OFFICE 2,417,083

ANNEALING TRAY

Paul S. Menough, Rocky River, Ohio

Application December 15, 1943, Serial No. 514,317

25 Claims. (Cl. 263—47)

This invention relates to annealing trays and more particularly to a tray which will not warp throughout an extended period of use.

As is well known to those versed in the art, it is customary when annealing certain articles to place them upon a support or tray sometimes called a grid which is then placed in an annealing furnace where the articles are subjected to a predetermined temperature for a certain length of time after which the support together with the articles is removed from the furnace and the support unloaded. Sometimes the articles are removed from the support or tray while still hot and more cold articles piled on the tray and the tray and the new articles returned to the furnace. Still further, very often the articles while on the trays are quenched after leaving the furnace which sudden cooling is still harder on the trays.

In any event the intermittent heating and cooling that these trays undergo causes severe stresses and in ordinary construction causes them to warp and bend, which eventually destroys them making frequent renewal or repair thereof necessary. This is especially true of previous fabricated trays which were made by welding since these types of structures could not stand the intermittent heating and cooling as well as the internal temperature differential when a tray loaded with cold articles was placed on a hot hearth.

By my present invention I have provided an improved tray construction which will not warp or distort and which is capable of sustaining large loads of heavy articles and which has a useful life considerably extended over that of the prior art.

It is therefore an object of my invention to provide an annealing tray or the like which will not warp even when subjected to alternate periods of heating and cooling.

Another object of the invention is to provide a tray which will not distort laterally during use.

Another object of the invention is to provide an annealing tray which has provision for differential expansion between the top and the bottom thereof, enabling the same to be placed with a load of cold articles on a hot hearth without causing the same to warp or break.

Another object of my invention is to provide a tray which although capable of differential expansion will not distort laterally.

Another object of the invention is to provide a tray construction which may be fabricated without welding the parts together.

Another object of my invention is to provide a tray construction which is mechanically put together.

Another object of my invention is to provide an annealing tray which although furnishing a substantial support for the article does not prevent access of heat to the article and whereby the article may be heated uniformly on all sides.

Another object of my invention is to provide a tray construction where the articles may be quenched directly on the tray without warping or bending the tray.

Another object of my invention is to provide a tray construction which has all the strength of a conventional beam construction but wherein the parts are capable of differential expansion and contraction without causing the same to twist or warp.

Still other objects of the invention and the invention itself will become more apparent from the following description of some embodiments thereof which description is illustrated by the accompanying drawings.

Figure 4:
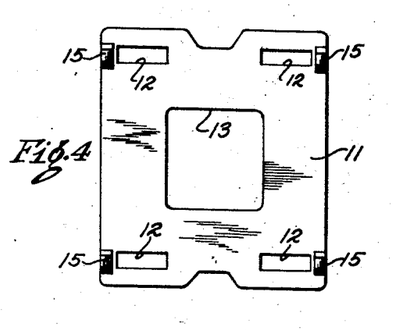
Fig. 4 is a face elevational view of one of the links removed from the assembly.
Figure 5:
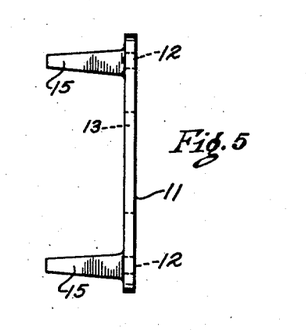
Fig. 5 is a plan view thereof.

Referring now to the drawings throughout which like parts are designated by like reference characters, and particularly to Figs. 1 to 5, inclusive. In this embodiment I provide load bearing bars 10 which extend longitudinally in the device and in spaced parallel relation to each other. The bars may be of rectangular section and are held in their desired spaced relation by link members or plates 11. The links 11, as best illustrated in Figs. 4 and 5 each comprise a substantially rectangular plate provided with openings 12 shaped to conform to the rectangular bars and to provide a sliding fit for the bars therethrough. Each plate may have four such openings each being disposed in a corner of the plate but spaced from the edges. A square opening 13 is provided in the mid portion of the link for the reception of web bars 14, the purpose of which will hereinafter more clearly appear. Extending from the side of each link, between the edge of the link and the openings 12, are fingers 15 which serve as a means for maintaining the proper spacing of the links.

Figures 1, 2:
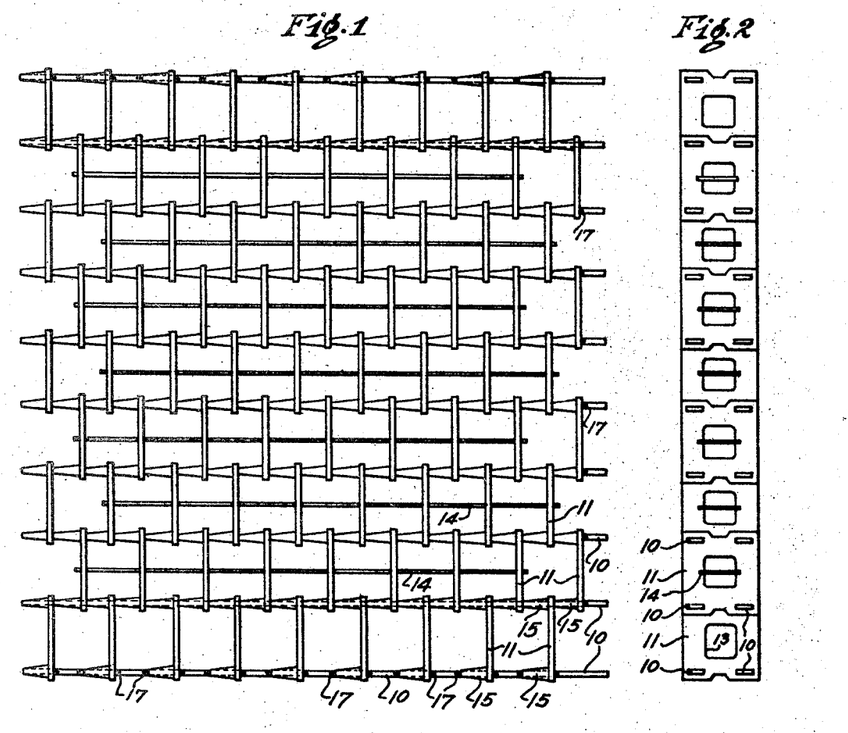
Fig. 1 is a plan view of a tray constructed according to my invention.
Fig. 2 is an end elevational view thereof.
Figure 3:
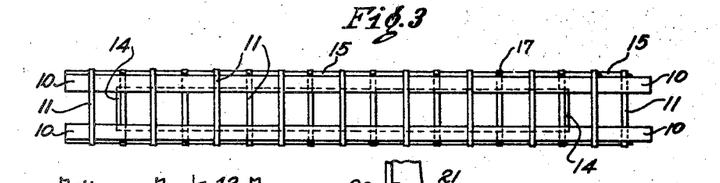
Fig. 3 is a side elevational view of the tray of Fig. 1.

As best shown in Figs. 1 and 2 the bars 10 extend through openings 12 in the links 11, the links holding the bars in spaced parallel relation to each other. The links are thus disposed in rows along the bars and the links in each adjacent row are so disposed that they are spaced intermediate the links of the next rows. This makes it possible as can best be seen from Fig. 1, for the bars 10 at the outside edge to extend through one row of links while the bars at the other edge of the same links, being the second series of bars (there being shown two bars 10 each spaced above the other), to not only pass through the openings 12 in the opposite corners of the links from the first bars but also pass through the openings 12 of the next row of links which are spaced intermediate the first row of links.

This alternate spacing of the links is maintained throughout the entire device. The lugs or fingers 15, because of the placement in the first row of bars 10, extend along the edges of the bars, and a small bead of metal may be built upon the bar at 17 to act as an abutment to thus hold the first series of links and the outside bars firmly against movement. The remaining fingers of the intermediate links also extend along the edges of the bars and abut the links in the adjacent row, each link of each row being held in properly spaced position by the links spaced intermediate these links in the adjacent row.

Means is also provided for preventing distortion of the device and for holding the parts in alignment and comprises the web bars 14 which are rectangular in cross section. These bars are wider than the openings 13 and are provided with notches in the edges extending transversely across the edges. They are each assembled in the plates or links by tilting them diagonally, inserting each through a row of openings 13 until the notches register with the sides of the plates after which they are rotated to a vertical position so that the sides of the notches engage with the opposite sides of the plates. The bar may then be tack-welded to the end plates or welded in more than one place to the intermediate plates if desired. Preferably they are retained by building up a small bead of metal on the face of the plates on each side of the bar against which the sides of the bar abut and thus are prevented from rotating, being held in a vertical position.

These plates act in conjunction with the links and the load bars to in effect provide the rigidity of a composite I beam or truss construction but with the added advantage that the load bearing bars may contract and expand relative to each other and the web bar without distorting the entire assembly. There is thus provided resistance against horizontal shear which lends strength to the entire device.

It will be noted that by this construction the top and bottom of the device are the same hence either part may serve as the top or bottom. Inasmuch as the load carrying bars 10 are free to move in their supporting links the expansion or contraction of these members have no effect on the device. This is especially desirable since one of these trays may be loaded up with as much as 5000 lbs. of cold castings and lifted by a gantry crane and set on top of a hearth, which may be at a temperature of 1600°. In this case the top of the device is cooled by the castings and the bottom is on the hot hearth, thus very severe strains are ordinarily set up which in the previous devices had a tendency to warp and break the device, but here the construction allows independent expansion of the elements and does not affect it. Also when the tray is removed from the furnace it is common practice to quench the articles and this is also very hard on ordinary construction.

Further the construction, especially viewing the device from the top or bottom, is an open construction which allows ready access to the articles by the heat and also allows for more uniform heating thereof.

The links may be cast or may be fabricated from sheet metal alloy and the bars may be made of a suitable alloy bar stock.

It sometimes becomes desirable to build these trays so that a larger volume of material may be supported thereby. In this case I provide stakes at spaced intervals around the edges of the tray which extend for a distance above the tray.

Figures 6, 7:
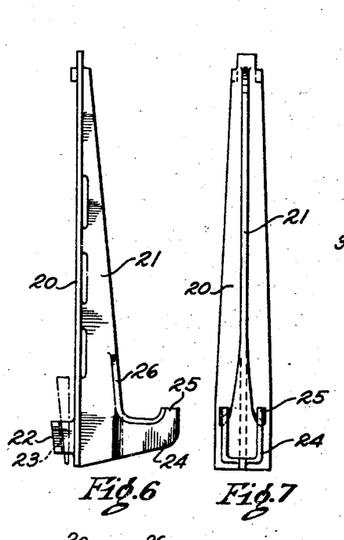
Fig. 6 is a side elevational view of a side stake used with the tray of my invention.
Fig. 7 is an elevational view thereof as seen from the inside of the tray.
Figure 8:
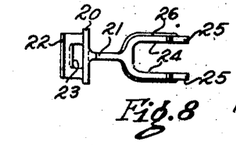
Fig. 8 is a plan view thereof.
Figures 9, 10:
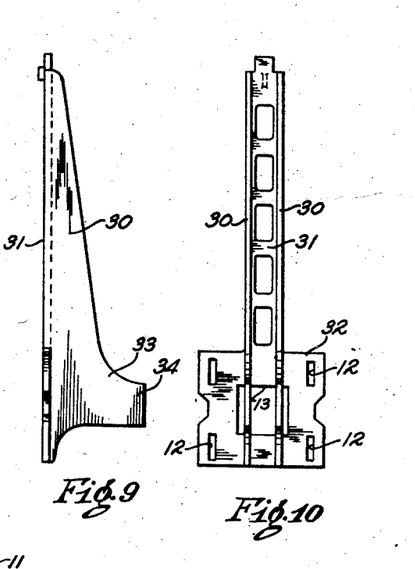
Fig. 9 is a side elevational view of an end stake for the tray of my invention.
Fig. 10 is a front elevational view thereof as seen from the inside of the tray.

Figs. 6 to 8 are side, inside elevation and plan views of stakes adapted to be attached to the sides, and Figs. 9 and 10 are side and inside elevational views of the end stakes.

The side stakes each comprise a flat upstanding body portion 20 which tapers in width toward the top and is re-enforced by a tapered web 21, on the side toward the tray which, together with the body, is T-shaped in cross section.

At the lower end of the stake on the side of the body opposite the web 21 there is provided an eye 22 which has a vertically extending tapered bore 23 substantially rectangular in cross section. Opposite to the eye the web 21 extends outward and is provided with a forked end 24 the ends of the fork extending upwardly a short distance at 25. A laterally extending re-enforcing web is also provided for the web and fork at 26.

Figure 11:
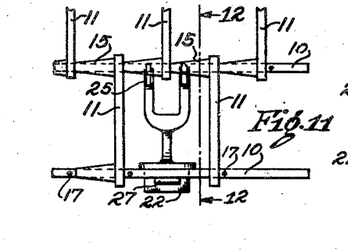
Fig. 11 is a fragmentary plan view of a tray showing the manner of attachment of the stake of Fig. 6.
Figure 12:
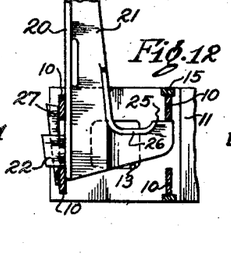
Fig. 12 is a view in side elevation of the stake showing it attached with certain parts broken away to more clearly show the manner of cooperation.

The stake is secured to the sides of the tray as shown in Fig. 11 by placing the base on the inside of the outer load bearing bars 10 with the eye 22 extending out between the upper and lower bars. A wedge pin 27 is then inserted through the eye and driven downwardly. The pin bears against the outer faces of the load bearing bars and the inside of the eye pulling the stake securely against the inner surface of the load bars. The fork extends across the space between adjacent load bars, straddling the link 11 of the adjacent row and the upwardly extending portions 25 rest against the lower edge of the upper load bar next adjacent the outer bar so that thrust against the upper part of the stake is transmitted upward to the load bearing bars and link plates.

The end stakes (Figs. 9 and 10) comprise an upper portion having side walls 30 which gradually widen as they approach the base and are held in spaced relation by the apertured web 31.

The base has cast integral with it, a plate 32 which is of the same form as the link plates previously described, being provided with openings 12 in the corners, and 13 in the center. This plate is flush with the web side 31, being the outside of the stake. The side members 30 extend outward at 33 adjacent the bottom being provided with square ends 34.

Figure 13:
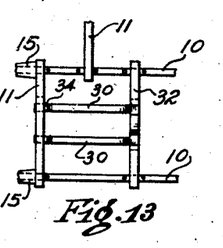
Fig. 13 is a view similar to Fig. 11 showing the stake of Fig. 9 in position on the tray.

In using this stake as shown in Fig. 13 the plate portion 32 replaces the endmost link of the row and the outward thrust upon the top of the stake is resisted by the engagement of the square ends 34 in the openings 13 in the plates next in back of the outside and in the same row. The parts 34 are disposed in the holes 13 on opposite sides of the tortion bars 14.

Figure 14:
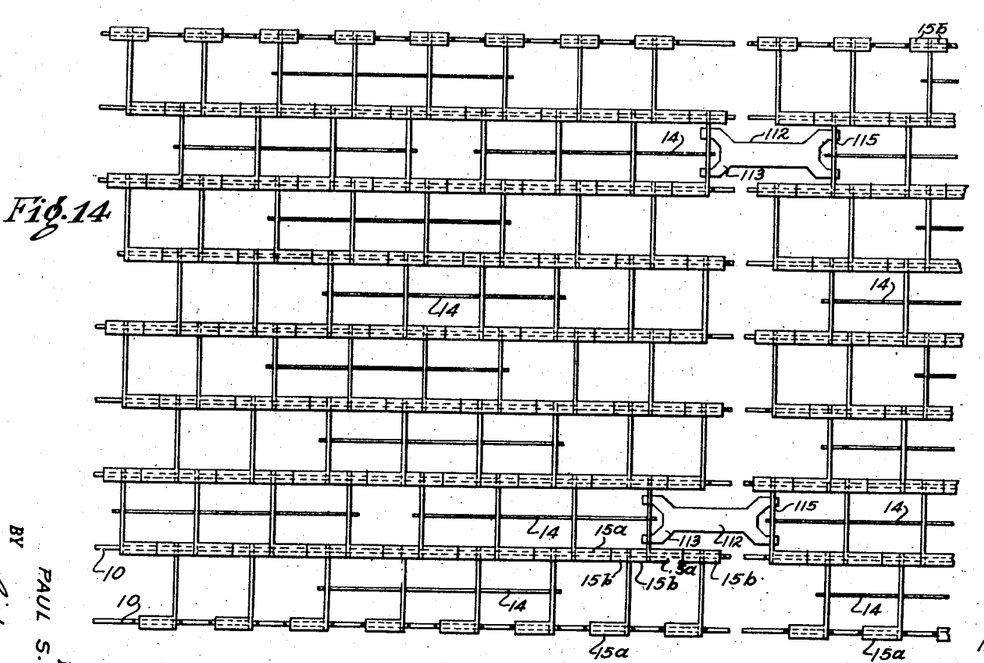
Fig. 14 is a plan view of a modified form of tray particularly adapted for use in roller bottom furnaces.

It is sometimes desirable to use trays constructed according to my invention in furnaces having roller bottoms. In this case, since the lugs 15 on the links 11 line up transversely across the tray they may provide aligned gaps which interrupt the bearing surface and do not readily adapt themselves to passage over the rollers hence considerable jarring or bumping may occur which is undesirable. Therefore I provide a modified form as best shown in Fig. 14 where even though gaps should occur they cannot form a continuous aligned gap and there are always some links in contact with the rollers.

Fundamentally, the construction is the same as described for the first embodiment except for the disposal of the lugs. In this case as can best be seen by viewing the endmost links in Fig. 14, the links are provided with spacing lugs 15a and 15b. The lugs 15a extend from one side only while the other lugs 15b extend from both sides in opposite direction. The links have the usual openings 12 to receive the load bars 10 and the central opening 13 for receiving the web bar. The plates on the outer extremities are secured against movement by welding beads onto the bars adjacent the lugs and plates. The length of each of the lugs 15a is equal to the length of the lugs 15b. In assembling the same the plates in adjacent rows are so positioned that the lugs 15b in one row abut the lugs 15a in the next row. This causes the line of abutment of the lugs to be out of alignment transversely across the tray; hence even though expansion or contraction between the lugs should occur, they will not cause gaps that will be in alignment.

In this case the web bars, instead of being continuous throughout the length of the links, are broken up. In Fig. 14 there is illustrated in the first row, one web bar and in the second row two web bars.

Figure 16:
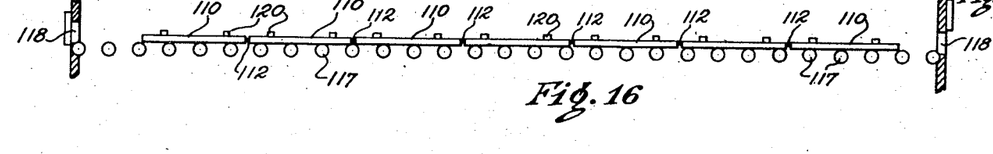
Fig. 16 is a diagrammatic view of a series of the trays of Fig. 14 in a roller bottom furnace.

Also in the case of a roller bottom furnace it is desirable to provide a series of these units as at 110 in Fig. 16 connected together in a train by couplings 112. Various types of coupling devices may be used, the one shown comprising a narrow body portion having forks 113 at its ends adapted to straddle the web bars 14 and provided with downwardly extending portions 114 which engage the link plates inside the hole 13 and provided with notches 115 which engage with the sides of the link plate.

The train of trays, as best shown in Fig. 16, ride upon the rollers 117 which are at the bottom of the furnace, the entrances or exits of which are illustrated diametrically at 118, in a manner well known to those versed in the art.

Figure 15:
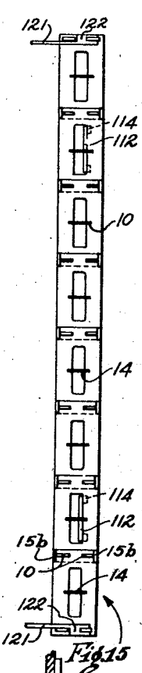
Fig. 15 is an end elevational view thereof.

Short side stakes 120 may be provided if desired comprising a short upstanding portion 121 and a lower forked portion 122 which is engaged with the lower load bar as can best be seen in Fig. 15.

Inasmuch as the web bars are broken up instead of being long continuous bars and the bars in adjacent rows being placed in staggered relation to each other, the stresses in the device are broken up even though the device is long eliminating any tendency to warp or distort. This same construction may be applied to extremely long trays effectively.

As best shown in Figs. 17 to 20, I also contemplate a frame for holding the tray of Fig. 1 at its outer edges which enables the same to be transported on a crane by the use of crane hooks. Briefly, it includes a fabricated structure to which the tray is attached having corner posts with which the crane hooks may engage.

Figure 17:
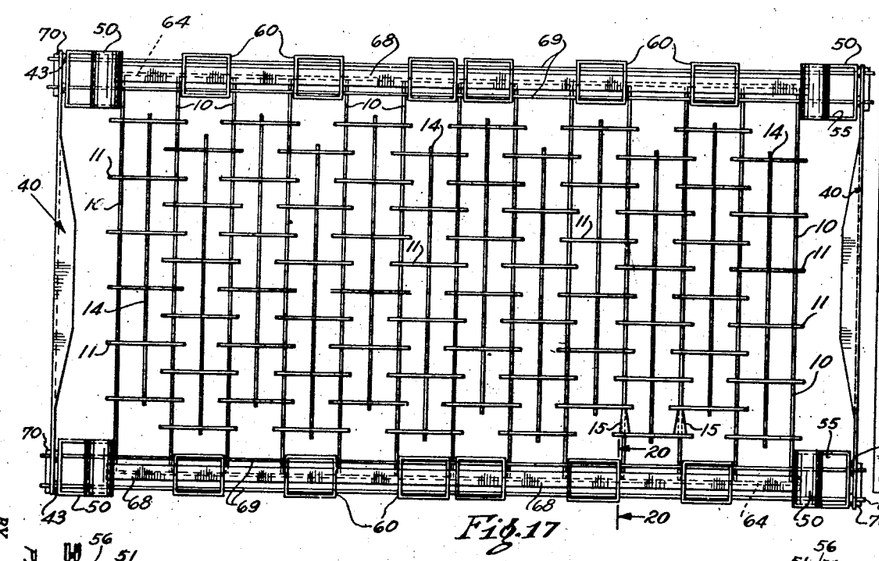
Fig. 17 is a plan view of another modification of the invention adapted for connection to a crane having crane hooks.
Figure 18:
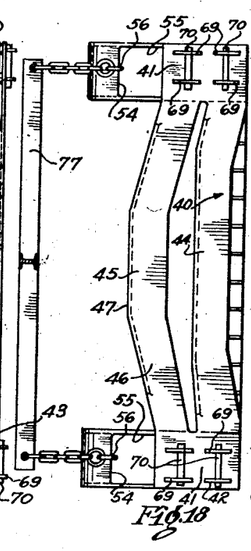
Fig. 18 is an end elevational view thereof.

More specifically the frame comprises end frame members 40 which may be cast or fabricated and includes the end portions 41 in which pairs of slots 42 are provided, the metal around the slots being re-enforced by building up the thickness as at 43. The mid section of the member is formed into two beams 44 and 45 which are of channel-shaped cross section, the beams inclining upward at 46 and merging with the centrally disposed horizontal parts 47 which are spaced apart as can best be seen by the drawings.

Figures 21, 22:
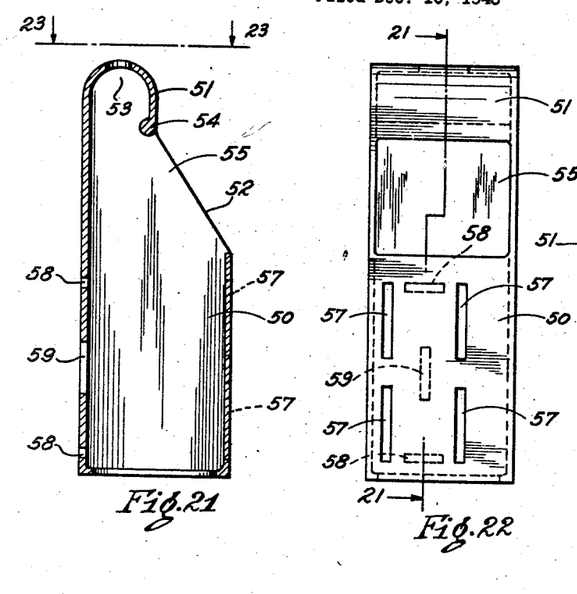
Fig. 21 is a sectional view of one of the corner posts of Fig. 17.
Fig. 22 is an elevational view thereof.
Figure 23:
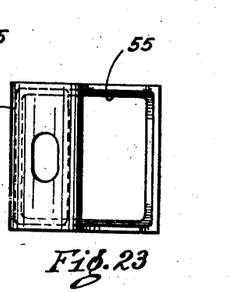
Fig. 23 is a top plan view thereof.

These members are adapted to be disposed adjacent the corner posts each of which, as best shown in Figs. 21 to 23 inclusive, comprises a substantially oblong upright hollow box 50, the upper portion of which is provided with a hook engaging portion 51 formed by shaping the sides as shown to provide progressively tapered sides at 52 toward the top which terminates in curved ends 53 and carrying the metal of one side up over and then downward on the front side and terminating in a re-enforced lip 54.

The front at 55 is open to allow a hook 56 to pass into the interior and engage the lip 54.

The lower front and back sides of the post are provided with slot shaped openings, the front having four vertically extending openings 57 and the back side in addition to similar openings having two horizontal openings 58 between the openings 57 and a central vertically extending opening 59. These openings are for the reception of bars later described.

Figure 24:
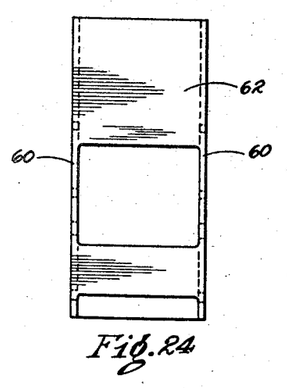
Figs. 24, 25 and 26 are front, side and rear elevational views of one of the side stakes used in the device of Fig. 17.
Figure 25:
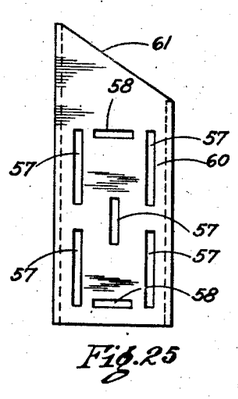
Figure 26:
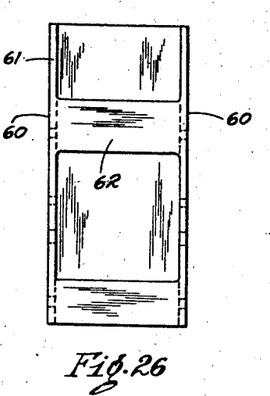

In addition to the corner posts, side stakes are provided which are best illustrated in Figs. 24 to 26 inclusive. Each comprises a pair of side walls 60 substantially rectangular in formation except for the top edge which slants downward at 61 toward the outside of the tray. The sides are held in spaced parallel relation to each other by webs 62 on the front and back as seen in Figs. 24 and 26, respectively. Each of the sides is provided with apertures 57, 58 and 59 corresponding to the slots in the corner posts.

Figure 19:
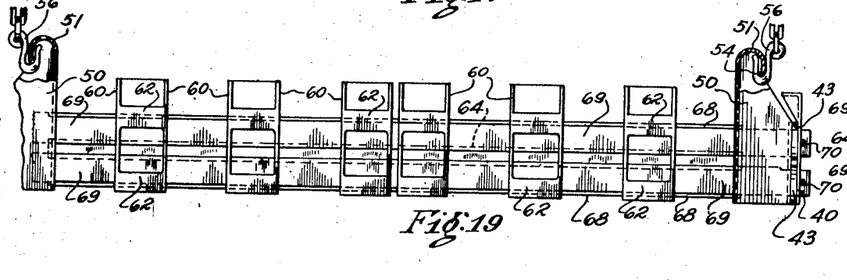
Fig. 19 is a side elevational view thereof.
Figure 20:
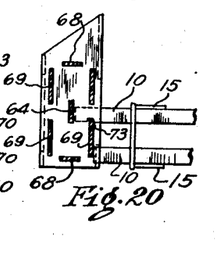
Fig. 20 is a section taken on the line 20—20 of Fig. 17.

As best shown in Figs. 17 and 19 the end members, corner posts and stakes are held in position around the tray by longitudinally extending bars. Bars 69 extend through the openings 57 in the stakes and corner posts and through the openings 42 in the end members and are held in place by wedges 70 which are driven through openings in the ends of the bars and bear against the outside face of the members 41. These pins or wedges may be tack-welded in place if desired. In addition to the bars 69, upper and lower bars 68 extend through the openings 58 and the corresponding openings in the back of the corner posts while a bar 64 extends through the openings 59. The load bearing bars as best shown in Fig. 20, extend adjacent the sides of the stakes, the upper bars resting on top of the lower bar 69 and abutting the bar 64. The bottom edges of the bars 10 may be notched at 73 to provide interlocking engagement therewith. The bottom load bearing bars abut the bottom bar 69 adjacent the edge. Only two of the lugs 15 are shown, the rest being omitted in the interest of clarity.

It will thus be seen that I provide a frame that furnishes a support for the tray and which may easily be raised by hooks 56 carried by the spreader 77 of the crane, and that a perfectly rigid non-distortable support is provided thereby which easily adapts itself for attachment to the tray but is still capable of independent expansion and contraction relative to the tray.

Figure 27:
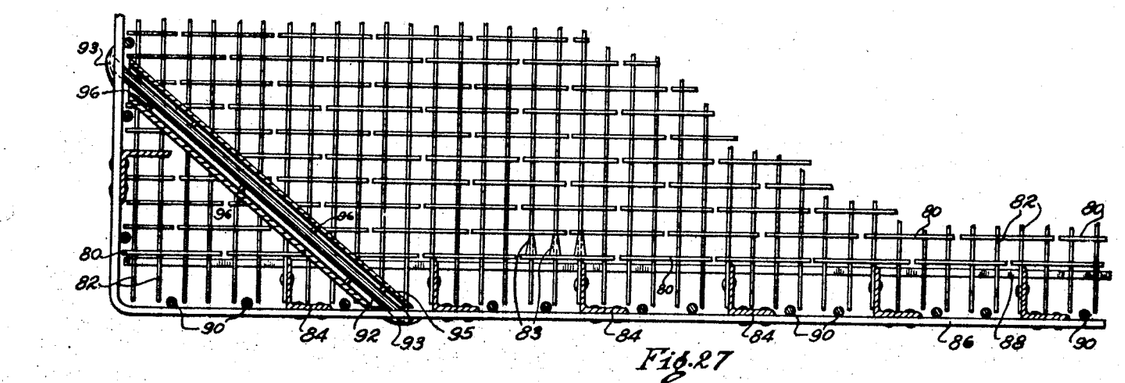
Fig. 27 is a fragmentary plan view of an annealing basket employing my invention.
Figure 28:
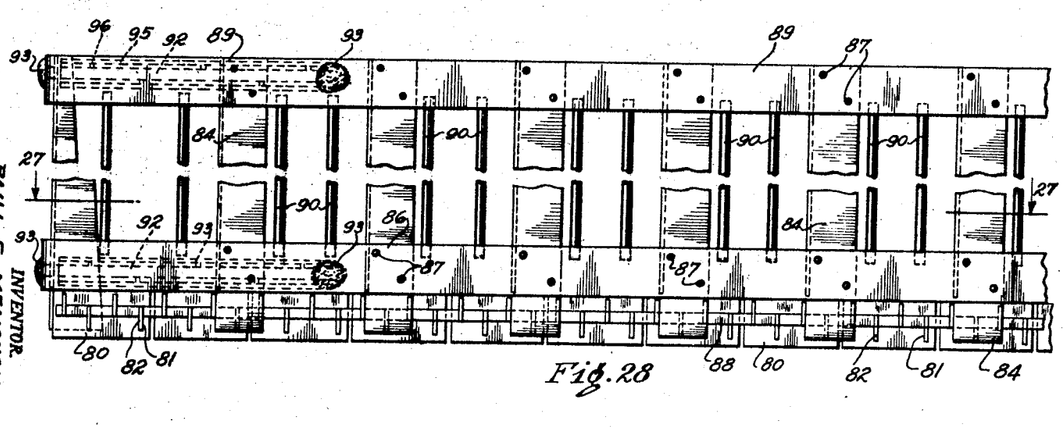
Fig. 28 is a fragmentary elevation thereof.

Figs. 27 and 28 show another form of the invention which contemplates a basket particularly adapted for holding a quantity of small parts. In this embodiment, as can best be seen from the end elevational view in Fig. 28, the link plates 80 are of substantially rectangular formation and are provided with vertically extending openings 81 of which there are two in the upper portion and two in the lower portion spaced in staggered relation and of such a length that they overlap in the horizontal direction. In this case the load bars 82 are also of such a height that viewing the same from a horizontal plane they overlap. This eliminates the desirability of the web bar. The links are also provided with the spacing fingers 83 extending in a plane normal to the face of the links and adjacent to the upper and lower edges of the plate so that when the load bars and links are assembled they act as spacers as described for the preceding embodiments. Only a part of these are shown in order to more clearly show the rest of the structure.

Secured at spaced intervals around the periphery of the tray, are upstanding posts 84 which may be of angular shaped construction being secured to the end of the tray at their bottom ends by extending the load bars through openings therein and welding beads on the outside to lock them in place and those on the side by riveting to the load bars. Just above the tray bottom a band of strap iron 86 extends entirely around the periphery. This band is held in position by rivets 87 which extend through the strap and the posts. At the corner the strap may extend at an angle of 135° instead of 90° in order to eliminate the square corner which would otherwise be present if the frame were entirely square. In a like manner there is provided an intermediate strap member not shown and a top strap 89. Intermediate the posts 84 there are provided series of vertically extending spaced rods 90, the whole providing a basket which permits the holding of small parts.

Means is provided to brace the sides of the basket and prevent distortion during use which comprises rods 92 extending across the corners and through the adjacent sides of the strap 86. The rods are headed over or welded on the outside of the straps as indicated at 93. Additional rods are also provided for the top strap 89. Each rod is shielded to protect it against direct heat and sudden changes in temperature by a sleeve 95 disposed around the rod and held in spaced relation by spacers 96 which may comprise pins driven through the rod before assembly with the sleeve, or lugs built up on the rods which slidably engage the inner wall of the sleeve. The sleeves are otherwise loose. This structure has the particular advantage that it braces the sides of the basket and holds them against outward bowing. The rods being insulated allows for the expansion and contraction to take place more in keeping with the cooling or heating of the load and prevents severe strains from otherwise being set up.

The extreme side series of link plates 80 may be held in position by welding beads on the load bearing rods or as shown they may be notched and a longitudinally extending keeper bar 88 inserted between the upper and lower bars.

I also contemplate forming the link plates by stamping. In this case it may be desirable to simultaneously form the lugs by spacing the plates from the metal removed from the openings 12.

Also, although the lugs 15 are shown wider at the base they may be the same width as the load bars.

It will thus be seen that I have provided a tray wherein the load bearing bars are capable of movement relative to the other parts of the tray, and that the top bars may expand and contract independent of the bottom bars and that during such expansion and contraction no strains or stresses are placed upon the structure. It has also been shown how the structure lends itself to various other structures than the tray per se, since it is possible to realize the advantages in a basket or stakes may be applied to enable larger loads to be carried.

In the several foregoing modifications of the present invention the upper and lower load bars function as compression and tension members respectively while the plates act as web members. Thus each tray comprises tension, compression and web members.

Having thus described my invention I am aware that numerous and extensive departures may be made therefrom without departing from the spirit or scope of my invention.

I claim:

1. A device of the class described comprising vertical link plates having openings therethrough, load bearing rods extending loosely through openings in a plurality of said link plates and web means extending through said link plates for holding said link plates in predetermined relative position, said web means being disposed intermediate and parallel to the load bearing rods and having engagement with the sides of the link plates.

2. A device of the class described comprising load bearing bars, link plates for loosely holding said load bars in upper and lower spaced vertical and horizontal relation to each other, web bars disposed intermediate the load bearing bars and extending in overlapping relation thereto and being secured to the link plates for equalizing load stresses between the upper and lower load bars and being freely expansible relative to the load bars.

3. An annealing tray comprising a composite beam construction including upper and lower spaced load bearing bars, link plates for loosely holding said load bars in spaced relation and web bars carried by said link plates and extending through said plates between pairs of said upper and lower load bearing bars, said load bars and said web bars being freely supported for independent expansion and contraction relative to each other.

4. An annealing tray comprising a composite beam construction including upper and lower spaced load bearing bars, link plates for loosely holding said load bars in spaced relation, bars carried by said link plates and extending through said plates between pairs of said upper and lower load bearing bars, said load bars and said web bars being freely supported for independent expansion and contraction relative to each other, and lugs carried by each of said link plates and engageable with an adjacent link plate to hold the plates in predetermined spaced relation to each other.

5. A device of the class described comprising a plurality of link plates, load bearing members extending loosely through said link plates and positioned thereby, means for holding said link plates in predetermined positions and extending through said link plates intermediate the load bearing members and having engagement with the sides of the link plates, and means carried by said link plates and engageable with an adjacent link plate to hold the plates in spaced alignment.

6. A device of the class described comprising load bearing rods disposed in spaced parallel relation to each other, means for supporting said rods including apertured plates, said rods extending loosely through apertures in said plates, means connected to the mid portion of said plates to hold the plates against relative movement, and means carried by the plates and engageable with each other to hold the outer extremities of the plates against movement.

7. A device of the class described comprising a plurality of parallel, spaced, flat link plates arranged on edge in a row, a plurality of load bars extending thru the plates of said row, and means cooperating with said plates to maintain them in predetermined spaced position.

8. A device of the class described comprising a plurality of parallel, spaced, flat link plates arranged on edge in a row, a plurality of load bars extending thru the plates of said row, and lugs carried by the plates to engage with adjacent plates and to maintain them in predetermined spaced position.

9. A device of the class described comprising a plurality of parallel, spaced, flat link plates on edge arranged in parallel rows with the ends of the plates of one row overlapping the ends of plates of an adjacent row, a plurality of load bars extending thru the overlapping ends of the plates of two adjacent rows, and means cooperating with the plates of each row of plates to maintain the plates of that row in spaced position.

10. A device of the class described comprising a plurality of parallel spaced plates having openings therethru and a bar having notches in its opposed edges, said bar extending thru said openings in said plates and receiving said plates in said notches while engaging said plates on their opposite sides.

11. A device of the class described comprising a plurality of parallel spaced plates having openings therethru and a plurality of bars having notches in their edges, each bar extending thru said openings of a plurality of said plates and each bar receiving plates in its notches and engaging such plates on their opposite sides.

12. An annealing tray comprising a laterally extending composite beam structure having a plurality of tension members, compression members and web members, said members being held in loose alignment by means of laterally extending links.

13. A device of the class described comprising a plurality of link plates disposed in spaced parallel relation in rows with the plates of one row staggered relative to the adjacent row and the plates of adjacent rows extending between the plates of the other row, said plates being formed to provide openings therethrough, load bearing bars extending through the plates of adjacent rows and carried thereby, means to hold the plates vertically comprising web bars extending through the plates of each row and holding the plates in their mid portions and lugs carried by said plates extending from the faces thereof and arranged to engage the face of the plates in adjacent rows to hold the edges of the plates in spaced relation to each other.

14. A device of the class described comprising a plurality of link plates disposed in spaced parallel relation in rows with the plates of one row staggered relative to the adjacent row and the plates of adjacent rows extending between the plates of the other row, said plates being formed to provide openings therethrough, load bearing bars extending through the plates of adjacent rows and carried thereby, means to hold the plates vertically comprising web bars extending through the plates of each row and holding the plates in their mid portions.

15. A device of the class described comprising a plurality of link plates disposed in spaced parallel relation in rows with the plates of one row staggered relative to the adjacent row and the plates of adjacent rows extending between the plates of the other row, said plates being formed to provide openings therethrough, load bearing bars extending through the plates of adjacent rows and carried thereby, means to hold the plates vertically comprising web bars extending through the plates of each row and holding the plates in their mid portions and lugs carried by said plates extending from the faces thereof and arranged to engage the face of the plates in adjacent rows to hold the edges of the plates in spaced relation to each other.

16. An annealing tray comprising a laterally extending composite beam structure having a plurality of tension members, compression members and web members and means for holding all aforesaid members in a predetermined relationship.

17. An annealing tray comprising a plurality of longitudinally extending and vertically spaced bars, means for holding said bars in predetermined spaced relationship, means cooperating with the ends of said bars for lifting and transporting said tray.

18. An annealing tray comprising a plurality of longitudinally extending and vertically spaced bars, means for holding said bars in predetermined spaced relationship, means cooperating with the ends of said bars for lifting and transporting said tray, said last mentioned means comprising a composite beam the members of which are loosely held in inter-relationship and are free to expand and contract individually.

19. A device of the class described comprising elongated bars, means to hold said bars in spaced parallel relation beside and above each other, comprising link plates, each link plate being formed with openings in opposite corners thereof, said bars extending loosely through said openings, means for holding said plates in spaced relation to each other comprising lugs extending from one face of each plate adjacent said openings for said bars and adapted to be juxtaposed to the bars, the lugs on one plate adapted to abut the opposite face of the other plate, said plates being formed with a central opening and web bars extending through the aligned openings in said plates and formed with notches, the walls of which are disposed in engagement with the sides of said link plates to hold said bars in said link.

20. An annealing tray comprising a bottom structure having load bearing bars disposed in vertically spaced parallel relation to each other, link plates for holding said bars in predetermined position, a rectangularly shaped superstructure attached to said bottom structure, brace rods extending across the corners of the superstructure and secured to adjacent sides thereof and means to shield and insulate said rods against impressed temperature fluctuations.

21. An annealing tray including supporting members at different levels comprising longitudinally extending bars, means to support said bars above each other with said pairs being disposed in spaced parallel relation to each other, comprising link plates each having openings in the corners through which the bars loosely extend, said plates being disposed in spaced parallel relation to each other and in rows, the plates in one row being staggered relative to the plates in the adjacent row, and engaging the bars in the adjacent row between the plates in that row, and means to hold the plates in said spaced relation comprising lugs carried by the plates adjacent the corner openings and juxtaposed to said bars and abutting the plates in the adjacent row, said plates being formed with substantially square central openings, and means to lend rigidity to the assembly comprising web bars extending through said central openings and having notches formed in the edges, the edges of the web bars formed with the notches and the edges of the bar forming the notches being disposed alongside the link plates on opposite sides thereof.

22. A device of the class described comprising a bottom formed with longitudinally extending load bars, link plates for holding said load bars in predetermined spaced parallel relation, stakes secured to said bottom at the margin thereof and means extending between said stakes comprising horizontally disposed strap members extending around the outer edge of the device and secured to the stakes, and means to restrict the openings between said straps and stakes carried by the straps, means to support the straps against distortion comprising rods extending from adjacent strap sides across the corners of the device and insulation means for said rods comprising a tubular shield loosely disposed over said rods and means for holding said shield in spaced relation to said rod.

23. In combination with an annealing tray having a bottom and sides formed to provide a basket, means to hold said sides in predetermined aligned relation comprising rods extending across the corners of the basket and secured to adjacent sides thereof, means to shield said rods against sudden temperature fluctuation.

24. In combination with a rectangular annealing tray having a bottom and sides extending upward formed to provide a basket, means to hold said sides against distortion and in predetermined aligned relation comprising rods bridging the corners of the basket and secured to adjacent sides thereof, means to shield and insulate said rods against heat comprising shields disposed over said rods spaced therefrom.

25. An annealing tray construction comprising a fabricated bottom structure having load bearing bars disposed in spaced parallel relation to each other and link plates for holding said bars in predetermined position, and means for supporting said bottom structure comprising a fabricated box beam extending around the tray bottom and capable of independent expansion and contraction relative thereto.

PAUL S. MENOUGH.

REFERENCES CITED

The following references are of record in the file of this patent:

UNITED STATES PATENTS

| Number | Name | Date |
|---|---|---|
| 1,863,053 | Hunter | June 14, 1932 |
| 2,145,708 | Blaney | Jan. 31, 1939 |
| 2,287,740 | Klouman | June 23, 1942 |
| 2,176,072 | Harris | Oct. 17, 1939 |
| 1,843,946 | Delano | Feb. 9, 1932 |